United States Patent Office 3,629,422
Patented Dec. 21, 1971

3,629,422
SOIL FUMIGATION METHOD
Jeffrey D. Griffith, Lafayette, Calif., assignor to The Dow Chemical Company, Midland, Mich.
No Drawing. Continuation-in-part of application Ser. No. 843,219, July 18, 1969, which is a continuation-in-part of application Ser. No. 589,813, Oct. 27, 1966. This application Aug. 3, 1970, Ser. No. 60,653
Int. Cl. A01n 9/22
U.S. Cl. 424—263   6 Claims

ABSTRACT OF THE DISCLOSURE

The invention relates to agronomic practices and more particularly is concerned with a new method and composition for the fumigation of a plant growth medium which comprises impregnating soil or other growth media with a composition containing a pesticidally effective amount of a 4-fluoropyridine having fluoro- or chloro- moieties in certain predetermined relationships on the other four carbon atoms of the ring structure.

CROSS-REFERENCE TO RELATED APPLICATION

This is a continuation-in-part of my copending application Ser. No. 843,219, filed July 18, 1969, now abandoned, which in turn was a continuation-in-part of my application Ser. No. 589,813 filed Oct. 27, 1966, now abandoned.

The present invention relates to the improvement of soils and crops and is particularly concerned with a new agronomic practice and composition for improving the ability of the soil to support plant growth by destroying soil dwelling fungi and weed seeds.

It is an object of the present invention to provide a new method and composition for the fumigation of soil in order to free it of such diverse organisms as invertebrate organisms, germinative seeds and emerging seedlings and fungi prior to the planting of crops. A further objective of the present invention is to provide a new agronomic practice and composition for improving the plant growing properties of soil and other growth media and the ability of such soil and growth media to support the growth of crops.

Other objects will become apparent from the following specification and claims.

The new agronomic practice comprises impregnating soil or growth media with an effective amount of a 4-fluoropyridine compound corresponding to the formula:

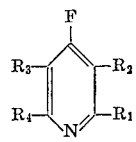

In this and subsequent formulae in the present specification each of $R_1$, $R_2$, $R_3$ and $R_4$ independently is fluoro- or chloro-. Such practice protects the crop plants against the ravages of invertebrate organisms, undesirable vegetation and soil dwelling fungi and thereby improves the growth and harvest of the crop plants.

The 4-fluoropyridine compounds are low volatile liquids or solids which are somewhat soluble in many organic solvents and of low solubility in water. These compounds are adapted to be readily and conveniently distributed in soil. Further, when employed in effective amounts, the compounds accomplish a rapid control of invertebrate organisms and fungi. In addition, the compounds also suppress the growth of germinant seeds and emerging seedlings. It is among the advantages of the present invention that these desirable and beneficial results are obtained in sand, silt and clay type soils. It is a further advantage that the compounds, while sufficiently persistent to accomplish the desired effect upon soil-inhabiting life forms such as invertebrate organisms, fungi, germinant seeds and emerging seedlings, dissipate in a reasonable period of time. Yet another advantage is that the 4-fluoropyridine compounds permeate soil for a distance of several inches from the point of application depending upon the temperature, moisture content, compactness and physical consistency of the soil or growth media.

The distribution of at least a minimum effective dosage of the 4-fluoropyridine compounds in soil is essential for the practice of the present invention. In determining an effective dosage of the 4-fluoropyridine compounds, at least a fungicidal amount of the desired toxicant should be employed. In general, good controls of fungi, germinative seeds and invertebrate organisms such as root knot nematodes ore obtained when the compounds are distributed in the soil in the amount of from about .05 to 500 parts or more by weight per million parts by weight of soil. However, the effective amount of the compound to be employed will vary according to the compound being employed and according to the quantity of soil treated.

In field applications, the 4-fluoropyridine compounds may be distributed in the soil by broadcast methods wherein the entire field is treated, or in row applications wherein the row area to be planted is treated. In broadcast methods, the compounds can be distributed at a dosage of 2.5 to 500 pounds per acre. Such dosages are employed through a cross-section of the soil as to provide for the presence therein of an effective concentration of the treating agent. In other applications, the 4-fluoropyridine compounds can be distributed in the rows where the crop is to be planted. In such row treatment the 4-fluoropyridine compounds can be employed at a rate of from about 1 to about 5 pounds per acre. In field application any of the conventional methods such as drenching, drilling, row placement, etc. may be used to distribute the chemical in the soil at a dosage of 2.5 to 500 lb. per acre for the surface area of the soil actually treated to produce effective control of weeds and soil pests. This does not, however, limit the application method to those conventionally practiced.

The method of the present invention may be carried out by distributing the unmodified 4-fluoropyridine in growth media. However, the present method also embraces the employment of liquid or dust compositions containing the toxicant. In such usage, the toxicant compounds may be modified with one or a plurality of additaments or soil treating adjuvants including water or other liquid carriers, surface-active dispersing agents and finely divided inert solids. Depending upon the concentration of the toxicant, such augmented compositions are adapted to be dsitributed in soil or to be employed as concentrates and subsequently diluted with additional inert carriers to produce the ultimate treating compositions.

The exact concentration of the 4-fluoropyridine compounds to be employed in the treating composition is not critical and may vary considerably provided the required dosage of toxicant is supplied in the growth medium. The concentration of toxicant in organic solvent compositions employed to supply the desired dosage generally is from about 10 to 85 percent by weight. With aqueous compositions, the required dosage is generally supplied with compositions containing from 0.2 to 50 percent by weight, although concentrations of 0.0002 percent by weight conveniently may be employed in irrigation treatments of soil. In dusts, the concentration of toxicant may be from about 1 to 50 percent by weight. Although concentrations as low as 0.1 percent by weight are sometimes employed. In compositions to be employed as concentrates, the toxicants may be present in a concentration of from 5 to 95 percent by weight.

The quantity of treating composition to be applied may vary considerably provided that the required dosage of active ingredient is applied to facilitate the penetration and distribution of said ingredient in growth media. The required amount of the active ingredient in the soil conveniently may be supplied per acre treated in from 1 quart to 20 gallons or more of the liquid carried, dispersed in 6 or more acre inches of irrigation water, or in from 50 to 2,000 pounds of inert solid carrier. A quantity of chemical is applied to produce a beneficial concentration in the quantity of soil treated.

Liquid compositions containing the desired amount of active ingredient may be prepared by dispersing the toxicants in water or an organic liquid carrier with or without the aid of a suitable surface-active dispersing agent such as an ionic or nonionic emulsifying agent. The surface-active dispersing agents are generally employed in the amount of from 1 to 20 percent by weight of the combined weight of the 4-fluoropyridine compound and surface-active agent in the composition. Suitable organic liquid carriers include acetone, xylene, toluene, isopropanol, polyglycols, chlorinated hydrocarbons such as methylene chloride, carbon tetrachloride and chlorobenzene and the petroleum distillates such as diesel fuel, kerosene, fuel oil, naphthas, and Stoddard solvent. Among the latter, the petroleum distillates boiling almost entirely under 400° F. at atmospheric pressure and having a flash point above 80° F. are generally preferred, however, any suitable liquid carrier or combination of carriers can be employed. The aqueous composition may contain a small amount of a water-immiscible solvent for the toxicant ingredient. In such compositions, the carrier comprises an aqueous emulsion, namely, a mixture of water, emulsifying agent and organic liquid. In the liquid compositions, the choice of dispersing and emulsifying agent and the amount thereof employed is dictated by the nature of the composition and by the ability of the agent to facilitate the dispersion of the toxicant compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active ingredient is dispersed in and on a finely divided inert solid such as clay, talc, chalk, gypsum, pyrophyllite and the like. In such operations, the finely divided carrier is mechanically mixed or ground with the 4-fluoropyridine. Similarly, dust compositions containing the toxicant compounds may be prepared from various solid surface-active dispersing agents such as bentonite, fuller's earth, attapulgite and other clays. Depending upon the proportions of ingredients, these dust compositions may be employed as concentrates and subsequently diluted with additional solids, surface-active dispersing agents or with chalk, talc or gypsum and the like to obtain the desired amount of active ingredient in a composition adapted to be employed for the treatment of soil. Also, such dust compositions may be dispersed in water with or without the aid of a dispersing agent to form spray mixtures.

When operating in accordance with the present invention, the 4-fluoropyridine compound is dispersed in soil or growth media in any convenient fashion, e.g., by simply mixing with the soil, by applying to the surface of the soil and thereafter dragging or disking into the soil to the desired depth, by employing a liquid carrier to accomplish the penetration and impregnation or by injection or drilling techniques whereby the toxicant is deposited beneath the surface of the soil.

In a further method, the distribution of the 4-fluoropyridine compound in soil may be accomplished by introducing the toxicants in the water employed to irrigate the soil. In such procedures, the amount of water may be varied with the porosity and water-holding capacity of the soil to obtain the desired depth of distribution of the toxicants.

A preferred group of soil fungicides and seedicides includes 3,5-dichloro-2,4,6-trifluoropyridine, 2,3,5-trichloro-4,6 - difluoropyridine and 2,3,5,6 - tetrachloro-4-fluoropyridine with 3,5-dichloro-2,4,6-trifluoropyridine and 2,3,5-trichloro-4,6-difluoropyridine being most preferred.

The following examples illustrate the invention but are not to be construed as limiting:

EXAMPLE 1

(a) 25 parts by weight of 3,5-dichloro-2,4,6-trifluoropyridine; 2,3,5-trichloro-4,6-difluoropyridine or 2,3,5,6-tetrachloro-4-fluoropyridine, 70 parts of xylene and 5 parts of an alkylated aryl polyether alcohol (Triton X–100) are mechanically mixed together to prepare concentrate compositions in the form of emulsifiable liquids.

(b) 25 parts by weight of any of the 4-fluoropyridine compounds listed in Example 1(a) are mechanically mixed with 4 parts of Triton X–100 to prepare water-dispersible concentrate compositions.

In a further operation, 25 parts by weight of any of the 4-fluoropyridine compounds listed in Example 1(a), 70 parts of fuller's earth, 3 parts of an alkyl aryl sulfonate (Nacconal NR) and 2 parts of a polymerized sodium salt of a substituted benzoid alkyl sulfonic acid (Daxad No. 27) are mechanically mixed to prepare concentrate compositions in the form of wettable powders.

These concentrate compositions are adapted to be dispersed in water to prepare aqueous compositions which have very desirable penetrating and wetting properties. The latter aqueous compositions are adapted to be employed to distribute effective concentrations of the toxicant compounds in soil.

EXAMPLE 2

Sandy loam soil is placed in sealable containers and seeded with pigweed and wild oats. Following the seeding, an acetone or isopropanol solution containing one of the 4-fluoropyridines described below at a concentration of 40 grams per liter as the sole toxicant is injected into the soil in an amount sufficient to provide 80 pounds of 4-fluoropyridine compound per acre foot. Thereafter, the containers are sealed and placed in a constant temperature room at 80° F. for one week. In a similar manner, checks are prepared by injecting into the seeded soil an amount of isopropanol or acetone equal to the amount employed in the corresponding test toxicant-containing containers.

After the containers are removed from the constant temperature room and opened, they are placed in a greenhouse and watered with Hoagland's solution to initiate germination and growth. Two weeks later seedicide activity is determined by comparing the number of seedlings growing in the treated containers with the number of seedlings growing in the untreated checks.

In such operations, 3,5-dichloro-2,4,6-trifluoropyridine; 2,3,5,6-tetrachloro-4-fluoropyridine and 2,3,5-trichloro-4,6-difluoropyridine each give 100 percent kill of the seeds of pigweed and wild oats.

EXAMPLE 3

In further operations, acetone or isopropanol solutions containing a 4-fluoropyridine as the sole toxic constituent were employed for the treatment of sandy loam soil infested with fungi of the genera Rhizoctonia, Aspergillus, Cladosporium, Penicillium, Mucor, Pythium, Fusarium, and Rhizopus. In such operations the fungi infested soil was placed in sealable containers. Thereafter, the toxicant-containing acetone or isopropanol solution was injected into the soil in an amount sufficient to provide 40 pounds of the 4-fluoropyridine per acre foot of soil. Following the treatment of the soil, the containers were sealed and maintained at a constant temperature of 70° F. for one week. The containers were then opened and the soil allowed to aerate for 3 days whereupon cotton seeds were seeded in the soil. In check operations, checks were prepared by treating containers of the same infested soil with an amount of acetone or isopropanol equal to the amount employed in the corresponding test containers. The check containers were then treated in exactly the same manner as the containers holding treated soil. Following the planting of seeds in the treated and check soils, the containers are placed in a growth environment for 10 days.

Thereafter the seedlings were examined for evidence of attack by the fungi. As a result of such examinations, it was observed that 3,5-dichloro-2,4,6-trifluoropyridine, and 2,3,5-trichloro-4,6-difluoropyridine each when employed as the sole toxic constituent gave 100 percent control of the above fungi when employed in the soil at a concentration of 40 pounds per acre foot. The check plants were found to be heavily infested with the fungal organisms. In addition, a substantial difference in size and health of the seedlings was observed between those plants grown in treated soil and those grown in the untreated checks with the plants grown in the treated soil being much larger.

EXAMPLE 4

In further operations, carried out exactly as described in Example 3, 3,5-dichloro-2,4,6-trifluoropyridine when employed as the sole toxic constituent at a rate of 10 pounds per acre foot of soil each gave 100 percent control and kill of the above representative genera of soil fungi. In still further such operations, 2,3,5-trichloro-4,6-difluoropyridine gave 100 percent control and kill of the same fungi when employed as the sole toxic constituent at a rate of 5 pounds per acre foot of soil. In another representative operation carried out as described in Example 3 but employing the dilution plate technique wherein, at the end of the 7 day incubation period, treated and untreated soil is plated in a selective agar designed to permit only the growth of fungi, it was found that 2,3,5,6-tetrachloro-4-fluoropyridine when employed as the sole toxic constituent at a rate of 40 pounds per acre foot gave 100 percent control and kill of the above representative genera of soil fungi.

EXAMPLE 5

An acetone fumigant composition, containing 3,5-dichloro-2,4,6-trifluoropyridine in an amount sufficient to provide 0.024 gram of toxicant per 1 milliliter of acetone is prepared. This composition is employed for the treatment of one-half of a field containing a sandy loam soil. The treatment is carried out by standard row treatment technique commonly referred to as the "bed and scrape" technique wherein a "shaped" row approximately 9 inches high and about 30 inches apart are formed using standard "shaping" equipment. At the time the shaped rows are formed, the fumigant composition is introduced at a depth of about 5 inches. The amount of composition employed is sufficient to supply 2 pounds of 3,5-dichloro-2,4,6-trifluoropyridine per acre. At the time of treatment, the soil is saturated with water approximately at field capacity.

Fourteen days after treatment the top 2 inches of the "shaped" rows are scraped off and the rows seeded to cotton. Throughout the growing reason the rows are observed to determine the presence of weeds. It is observed that in such operations good control of lambsquarters, pigweed, watergrass and Purslane are obtained. In the untreated half of the field the weed infestation due to the above-mentioned weeds is very severe with the weeds practically choking the cotton and materially reducing the size of the cotton plants and their number.

The 4-fluoropyridine compounds of the present invention are prepared in accordance with known halogen exchange procedures. In such procedures, the halogen exchange is carried out by contacting potassium fluoride with a polyhalopyridine corresponding to the formula

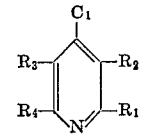

wherein $R_1$, $R_2$, $R_3$ and $R_4$ are as previously defined. The contacting of the reactants is carried out in the presence of an inert organic liquid as reaction medium. Representative inert organic liquids include dimethyl sulfoxide, dimethyl formamide, N-methyl-2-pyrrolidone, sulfolane and dimethylsulfone. The exchange reaction proceeds readily at temperatures between 100° and 200° C. with the production of various 4-fluoropyridines and the potassium chloride reaction by-product. Following the reaction period, the reaction mixture is filtered to remove unreacted potassium fluoride and the solid by-product of reaction, the filtrate obtained during this filtration is washed with water and the organic layer obtained during the washing procedure dried and fractionally distilled under reduced pressure to obtain the various 4-fluoropyridine distillation fractions.

In representative operations, pentachloropyridine (502.8 grams; 2 moles) and potassium fluoride (581.1 grams; 10 moles) are contacted in a liter of dimethylformamide. The reaction mixture is then heated with stirring at from 115° to 120° C. for 1.5 hours. Following the reaction period, the reaction mixture is filtered hot to remove inorganic salts, and the filtrate is diluted with water. The phases are separated and the organic phase is washed with water to remove DMF. This water wash is added to the aqueous phase, and the aqueous phase is extracted three times with hexane. The hexane extracts are combined with the organic phase consisting of crude fluorinated products. The resulting solution is dried with sodium sulfate, and the hexane solvent is removed by distillation. The crude product remaining is then fractionally distilled under reduced pressure to obtain 3,5-dichloro-2,4,6-trifluoropyridine (boiling point 113.5–114° C. at 197 millimeters of Hg), 2,3,5-trichloro-4,6-difluoropyridine (boiling point 138° C. at 120 millimeters of Hg), and 2,3,5,6-tetrachloro-4-fluoropyridine (melting at 40–42° C.).

I claim:
1. A method for controlling fungi which comprises impregnating soil with a fungicidal amount of a 4-fluoropyridine compound corresponding to the formula

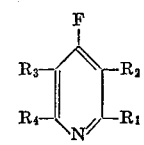

wherein each of $R_1$, $R_2$, $R_3$ and $R_4$ independently is fluoro- or chloro-.

2. The method claimed in claim 1 wherein the soil is impregnated with at least .05 part by weight of the 4-fluoropyridine compound per million parts of soil.

3. The method claimed in claim 2 wherein the 4-fluoropyridine is a member of the group consisting of 3,5-dichloro-2,4,6-trifluoropyridine, 2,3,5-trichloro-4,6-difluoropyridine, and 2,3,5,6-tetrachloro-4-fluoropyridine.

4. The method claimed in claim 1 wherein the 4-fluoropyridine is 2,3,5-trichloro-4,6-difluoropyridine.

5. The method claimed in claim 1 wherein the 4-fluoropyridine is 2,3,5-dichloro-2,4,6-trifluoropyridine.

6. The method claimed in claim 2 wherein the 4-fluoropyridine is 2,3,5,6-tetrachloro-4-fluoropyridine.

References Cited
UNITED STATES PATENTS

| | | | |
|---|---|---|---|
| 3,256,290 | 6/1966 | John Stow et al. | 424—263 |
| 3,284,293 | 11/1966 | Mohr et al. | 424—263 |
| 3,317,542 | 5/1967 | Haszeldiwe et al. | 424—263 |

OTHER REFERENCES

Chemical Abstracts (I), 40:4471 (3), (1946).
Chemical Abstracts (II), Subject Index (J–Z), vol. 60, June 1964, p. 2202 (S).

JEROME D. GOLDBERG, Primary Examiner